US007610432B2

(12) United States Patent
Azuma

(10) Patent No.: US 7,610,432 B2
(45) Date of Patent: Oct. 27, 2009

(54) METHOD AND APPARATUS FOR ASSIGNING ALIAS NODE NAMES AND PORT NAMES WITHIN A TAPE LIBRARY

(75) Inventor: Yasunori Azuma, Chiba (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 10/791,634

(22) Filed: Mar. 2, 2004

(65) Prior Publication Data

US 2004/0177287 A1  Sep. 9, 2004

(30) Foreign Application Priority Data

Mar. 4, 2003 (JP) .............................. P2003-056528

(51) Int. Cl.
*G06F 12/00* (2006.01)
(52) U.S. Cl. ..................... 711/4; 711/111; 711/154; 711/200; 711/217; 710/9
(58) Field of Classification Search ................ 711/4, 711/111, 154, 200, 217; 710/9
See application file for complete search history.

(56) References Cited

U.S. PATENT DOCUMENTS

| 6,598,174 B1 * | 7/2003 | Parks et al. .................... 714/6 |
| 6,665,714 B1 * | 12/2003 | Blumenau et al. ............ 709/222 |
| 6,754,728 B1 * | 6/2004 | Yardumian et al. ............. 710/9 |
| 6,757,694 B2 * | 6/2004 | Goodman et al. ......... 707/104.1 |
| 6,779,083 B2 * | 8/2004 | Ito et al. ..................... 711/114 |
| 6,877,042 B2 * | 4/2005 | Tawil et al. ................. 709/250 |
| 6,880,101 B2 * | 4/2005 | Golasky et al. ................ 714/4 |
| 6,907,498 B2 * | 6/2005 | Kitamura et al. ............ 711/112 |
| 7,330,897 B2 * | 2/2008 | Baldwin et al. ............. 709/229 |
| 7,363,425 B2 * | 4/2008 | Camble et al. .............. 711/114 |
| 7,440,949 B1 * | 10/2008 | Barker ......................... 707/10 |
| 2002/0129230 A1 * | 9/2002 | Albright et al. ................ 713/1 |
| 2002/0144056 A1 * | 10/2002 | Tadokoro et al. ............ 711/111 |
| 2002/0161852 A1 * | 10/2002 | Allen et al. ................. 709/217 |
| 2003/0131167 A1 * | 7/2003 | Rankin et al. ............... 710/104 |

FOREIGN PATENT DOCUMENTS

| JP | 11 338646 | 12/1999 |
| JP | 2000 330924 | 11/2000 |
| JP | 2001 306414 | 11/2001 |

OTHER PUBLICATIONS

Fiber Channel Industry Association—Japan, "Fiber Channel Gijutsu Kaisetsusho" (Fiber Channel Technology Guide), Japan, Ronso-sha, May 15, 2001, first ed., p. 269-271.

* cited by examiner

*Primary Examiner*—Sanjiv Shah
*Assistant Examiner*—Arpan Savla
(74) *Attorney, Agent, or Firm*—Frommer Lawrence & Haug LLP; William S. Frommer; Thomas F. Presson

(57) ABSTRACT

A tape library apparatus comprising a plurality of FC drives. A host computer and a fiber channel switch portion are connected with an optical fiber cable through respective fiber channel interfaces. The fiber channel switch portion and FC drives are connected with respective optical fiber cables through respective fiber channel interfaces. A controlling portion and the FC drives are connected with respective -232C cables. Alias WWNNs and alias WWPNs of the FC drives are assigned by the controlling portion through respective RS-232C cables. Data reproduced by the FC drives and data supplied thereto are transmitted to and received from the host computer through, for example, respective optical fiber cables.

6 Claims, 5 Drawing Sheets

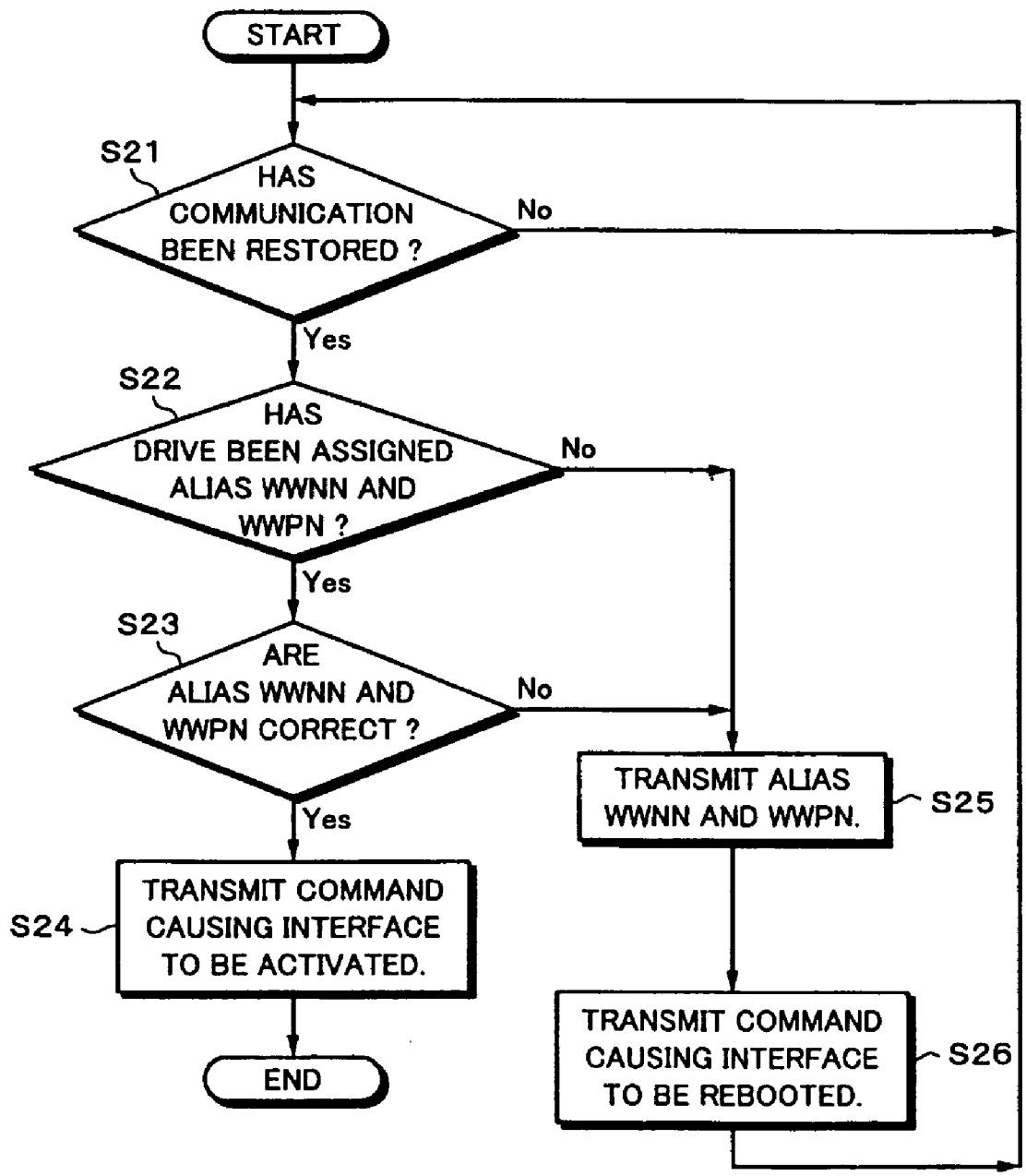

METHOD AND APPARATUS FOR ASSIGNING ALIAS NODE NAMES AND PORT NAMES WITHIN A TAPE LIBRARY

BACKGROUND OF THE INVENTION

1. Field of the Invention

The present invention relates to a tape library apparatus for allowing an apparatus for recording and reproducing information to and from a recording medium, namely a so-called drive to be easily handled and a controlling method thereof.

2. Description of the Related Art

A system that is capable of storing a plurality of detachable recording mediums (for example, cassette tapes and disc shaped magnetic recording mediums) to a recording and reproducing unit (hereinafter referred to as drive) and recording and reproducing various types of information to and from the stored recording mediums has been used. The system is called a library system or auto changer unit. However, in the following description, the system is referred to as library system.

The library system comprises a cassette console, a drive console, a conveying unit, a so-called elevator, a monitor, and a controlling unit. The cassette console is composed of a plurality of shelves that hold the forgoing recording mediums. The drive console includes a so-called drive that records and reproduces information to and from a recording medium. The elevator is a conveying unit travels among the cassette console, the drive console, and so forth and selectively conveys a recording medium from each shelf of the cassette console to the drive of the drive console. The monitor displays the statuses of the individual consoles and the statuses of the drive and the individual shelves. The controlling unit controls the drive and the conveying unit.

[Patent Document 1]

Japanese Patent Laid-Open Publication No. 2000-149516

The Patent Document 1 is directed to a library system would solve troublesome and inconvenient operation of a conventional system that requires the user to input a cassette identifier (ID) of a tape cassette and a bin number to a cassette move window upon traveling the tape cassette from one shelf to another shelf.

The library system uses a fiber channel connected with coaxial cables or optical fiber cables that allows data to be transferred to a host computer at high speed.

For example, as shown in FIG. 1, a host computer 41 and a library system 42 are connected through the Fiber Channel (FC). The library system 42 is composed of a converter 43 and tape drives 44 and 45. In the library system 42, data that is reproduced by the tape drives 44 and 45 is supplied to the converter 43 through the Small Computer System Interface (SCSI). The converter 43 converts SCSI format data into fiber channel format data and supplies the converted fiber channel format data to the host computer 41.

Since the library system 42 uses the SCSI whose data transfer speed is much slower than that of the fiber channel, the performance of the fiber channel that connects the host computer 41 and the library system 42 cannot be fully used.

In contrast, a library system that has a plurality of tape drives using a fiber channel interface (these tape drives are referred to as FC drives) is known. Each FC drive has been assigned a World Wide Name (WWN) as a unique ID upon production thereof. Since each FC drive has been assigned a WWN that is unique in the world, a WWN that has been assigned cannot be changed after the FC drive was marketed.

However, if an FC drive becomes defective and is replaced with a substitute FC drive, the WWN of the defective FC drive is changed to the WWN of the substitute FC drive.

Since the host computer uses WWNs to manage FC drives, only by replacing the defective FC drive with a substitute FC drive, the substitute FC drive cannot be used. To use the substitute FC drive, it is necessary to change the management content of the WWNs registered in the host computer and then reboot the host computer.

However, if the host computer is mission critical, namely operates 24 hours a day, 365 days a year, it could not be easily rebooted. Thus, the replaceability of an FC drive on site would be very bad.

In addition, if the WWN of the substitute FC drive is assigned to the defective FC drive, since the WWN of the defective FC drive has been uniquely assigned in the world upon production thereof, the WWNs of the FC drives should be managed worldwide. Thus, it was difficult to replace a defective FC drive with a substitute FC drive.

OBJECTS AND SUMMARY OF THE INVENTION

Therefore, what is needed is to provide a tape library apparatus for allowing an FC drive to be easily replaced with a substitute FC drive and a controlling method thereof.

A first aspect of the present invention is a tape library apparatus to which a node ID is assigned and that is connected to a host computer, comprising:

a plurality of drives for recording and reproducing data to and from respective large capacity tape recording mediums, the drives having respective interfaces being capable of transferring large capacity data to the host computer, wherein the drives are assigned respective node IDs as first addresses and respective port IDs that represent mounted order numbers as second addresses and the interfaces are activated.

A second aspect of the present invention is a method of controlling a tape library apparatus to which a node ID is assigned and that is connected to a host computer, comprising the steps of:

assigning respective node IDs as first addresses and respective port IDs that represent mounted order numbers as second addresses to a plurality of drives for recording and reproducing data to and from respective large capacity tape recording mediums, the drives having respective interfaces being capable of transferring large capacity data to the host computer, and activating the interfaces.

Since the first and second addresses can be assigned to a drive, it can be replaced with a substitute drive without need to reboot the host computer that is mission critical.

According to the present invention, with an alias WWNN and an alias WWPN that can be assigned to each library system, after a defective FC drive is replaced with a substitute FC drive, it can be controlled and managed with the same WWN as the defective FC drive without need to reboot the host computer.

According to the present invention, even if an alias WWNN and an alias WWPN that can be assigned to each library system have not been assigned, each FC drive can be used with its unique WWN that was assigned upon production thereof.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a block diagram describing control preformed by a controlling portion according to the embodiment of the present invention.

DETAILED DESCRIPTION OF THE PREFERRED EMBODIMENT

Figure 1:
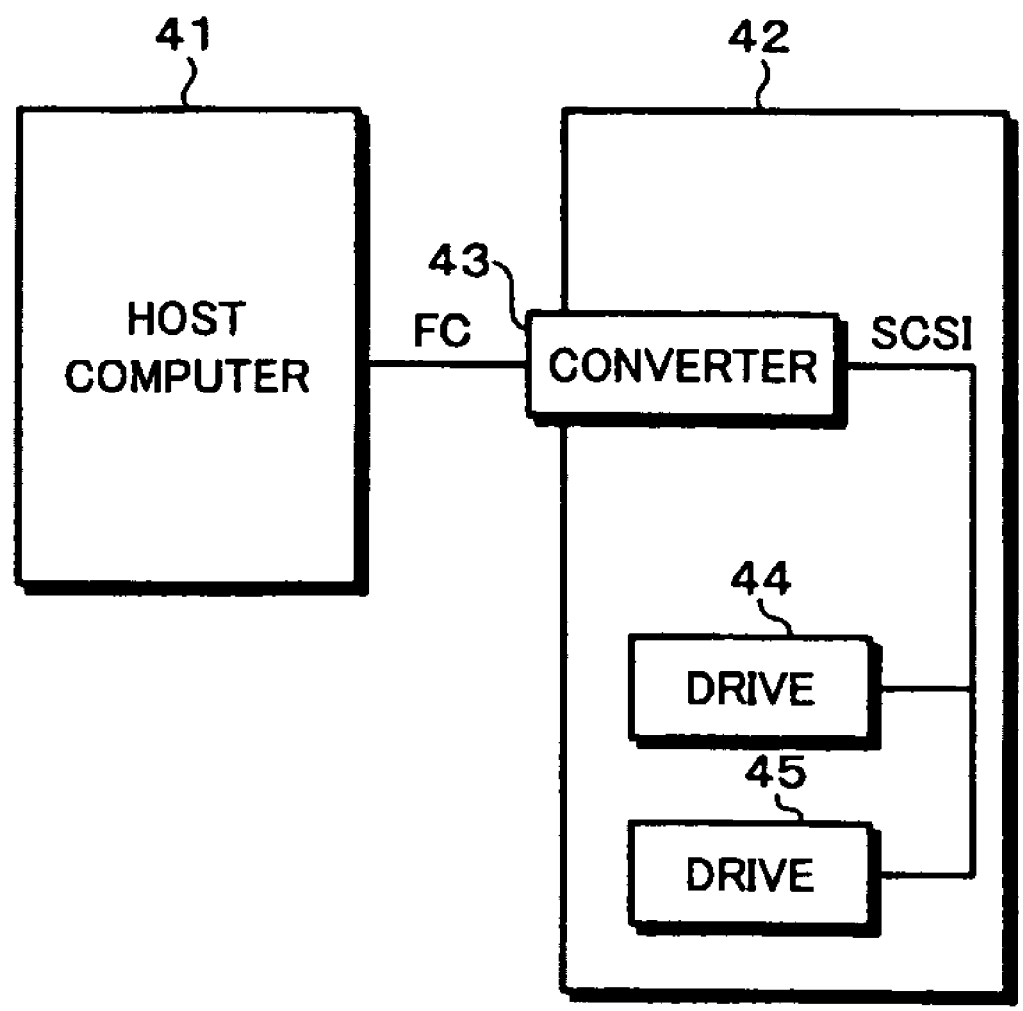
FIG. 1 is a block diagram describing a conventional host computer and library system.
Figure 2B:
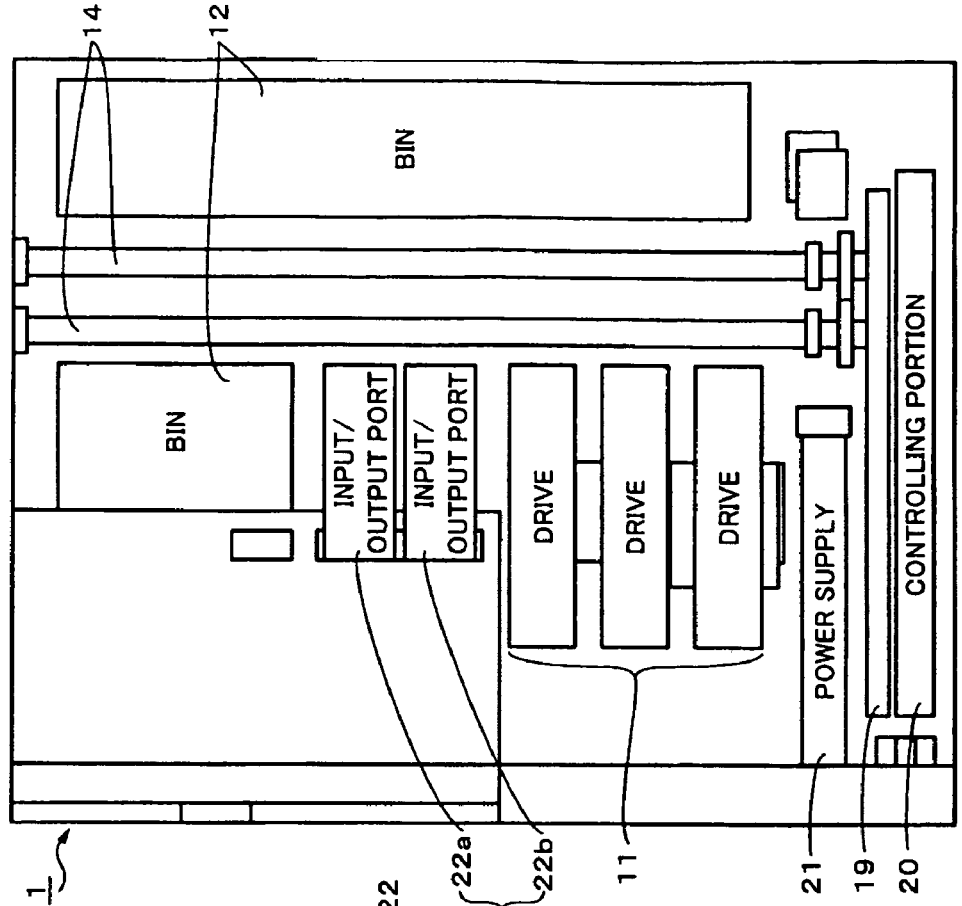
FIG. 2A and FIG. 2B are schematic diagrams showing a structure of a library system according to an embodiment of the present invention.
Figure 2A:
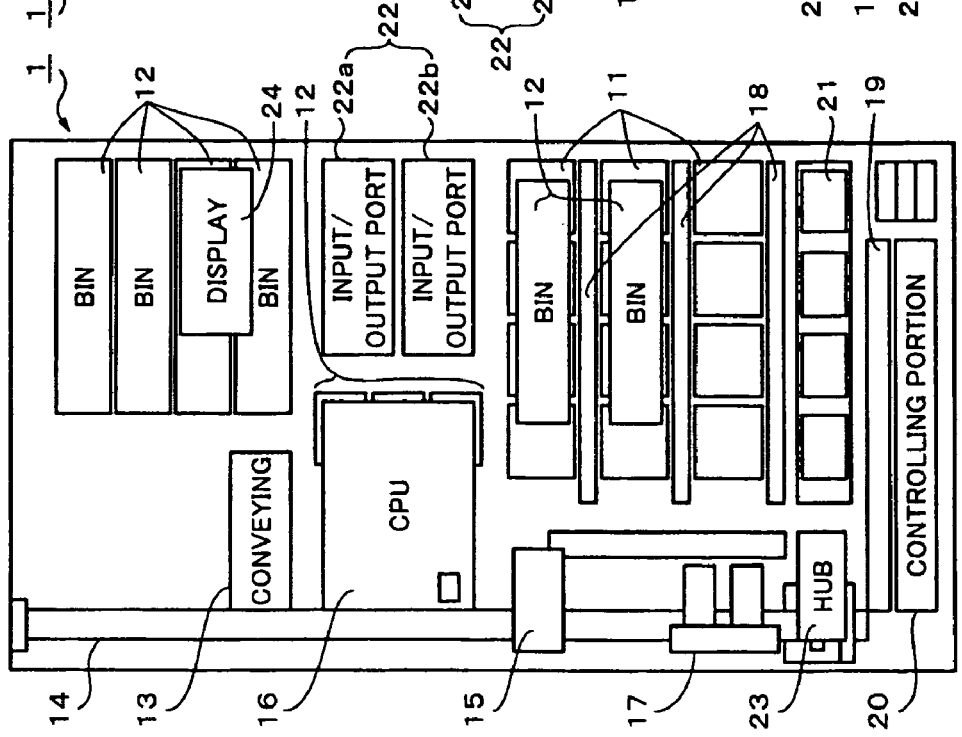

Next, with reference to the accompanying drawings, an embodiment of the present invention will be described. FIG. 2A and FIG. 2B show an overall structure of a library system according to the present invention. The library system is designated by reference numeral 1. FIG. 2A shows an internal structure of the library system 1 viewed from the front thereof. FIG. 2B shows an internal structure of the library system 1 viewed from one side thereof.

The library system 1 comprises a drive area 11, so-called bins 12, and a cassette conveying unit 13. The drive area 11 has a plurality of FC drives that are recording and reproducing units each of which records and reproduces information to and from a cassette tape. The bins 12 are cassette holding shelves each of which has a plurality of holding portions that are capable of holding a plurality of cassette tapes each. The cassette conveying unit 13 slidably travels on a pair of guide rails 14 between the bins 12 and the drive area 11.

At that point, the cassette conveying unit 13 is controlled by a CPU 16 in accordance with a control signal received from a terminal server 15. Power is supplied to the cassette conveying unit 13 by a power supply portion 17.

In the drive area 11, boards 18 are disposed one every a predetermined number of FC drives. The boards 18 recognize and drive the FC drives. All the FC drives are connected to a fiber channel switch portion 19 with for example respective optical fiber cables. The fiber channel switch portion 19 properly selects the connected FC drives so as to multiplex data reproduced from FC drives on time division basis.

The entire library system 1 is controlled by a controlling portion 20. Power is supplied to all portions of the entire library system 1 by a power supply portion 21. The terminal server 15, the CPU 16, and the controlling portion 20 transmit and receive data through a hub 23.

An input/output port portion 22 is composed of an upper port portion 22a and a lower port portion 22b. The upper port portion 22a and the lower port portion 22b each have a plurality of cassette tape loading and unloading ports. For example, the upper port portion 22a may be a port for loading a cassette tape to the library system 1, whereas the lower port portion 22b may be a port for unloading a cassette tape from the library system 1. A display portion 24 is composed of for example liquid crystal display device.

The FC drives disposed in the drive area 11 have been assigned unique WWNs upon production thereof. According to the present embodiment, when the FC drives are mounted on the library system 1, besides those WWNs, other WWNs dedicated for the library system 1 can be assigned to the FC drives. Hereinafter, the WWNs dedicated for the library system 1 are referred to as alias WWNs.

According to the present embodiment, the library system 1 is considered as one node. The node ID of the library system that has the FC drives is assigned an alias World Wide Name Node (WWNN). In addition, a plurality of FC drives are considered as different one-node ports. The FC drives are assigned unique port IDs as IDs of the FC drives in the mounting order thereof. Hereinafter, the assigned port IDs are referred to as alias World Wide Port Names (WWPNs).

When a newly mounted FC drive is detected, it is assigned an alias WWNN and an alias WWPN in accordance with a control command by the controlling portion 20. In accordance with the alias WWNN, it can be easily determined whether or not the FC drive is a newly mounted FC drive. In accordance with the alias WWPN, it can be easily determined whether or not the mounted position of the FC drive has been moved.

When an FC drive has not been assigned an alias WWNN or when an FC drive is not assigned an alias WWNN by the controlling portion 20 (namely, the FC drive has not been mounted on the library system 1), a WWN that has been uniquely assigned to the FC drive upon production thereof is used. Thus, the uniqueness of WWNs can be assured.

The alias WWNN and the alias WWPN are stored in for example a nonvolatile memory disposed in the FC drive.

Figure 3:
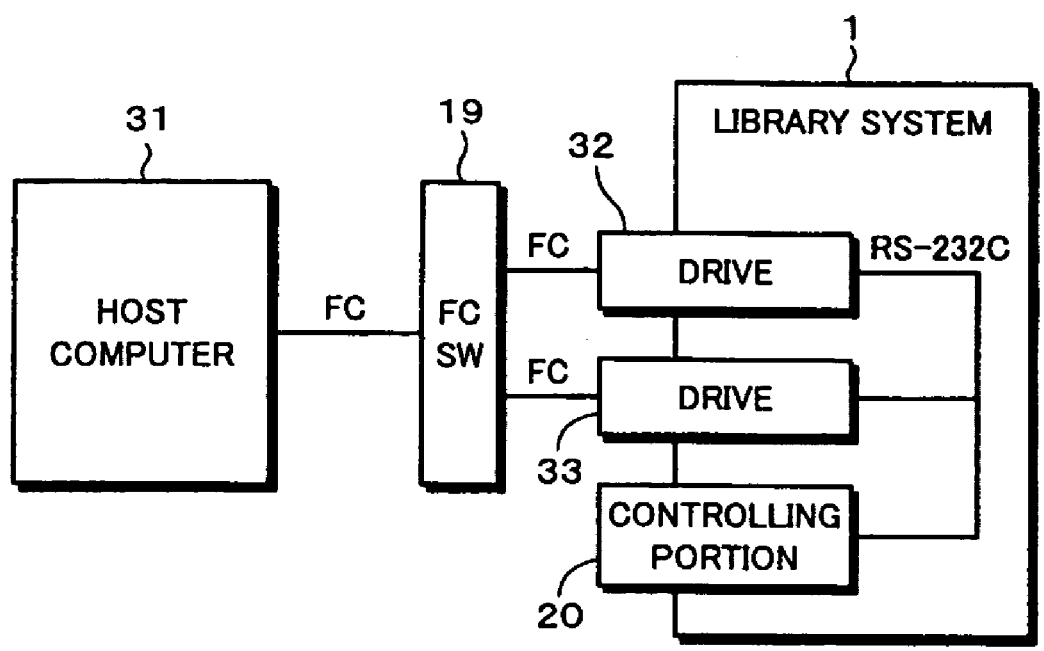
FIG. 3 is a block diagram describing a connection of a host computer and FC drives according to the embodiment of the present invention.

Next, with reference to FIG. 3, a connection of a host computer and FC drives will be described. The host computer is designated by reference numeral 31. The host computer 31 and the fiber channel switch portion 19 are connected with an optical fiber cable through respective fiber channel interfaces. In addition, the fiber channel switch portion 19 and the FC drives 32 and 33 are connected with respective optical fiber cables through respective fiber channel interfaces. In contrast, the controlling portion 20 and the FC drives 32 and 33 are connected with respective RS-232C cables.

The FC drives 32 and 33 are assigned alias WWNNs and alias WWPNs with respective RS-232C cables by the controlling portion 20. Data reproduced by the FC drives 32 and 33 and data supplied thereto are transmitted and received to and from the host computer 31 through for example an optical fiber cable.

Figure 4:
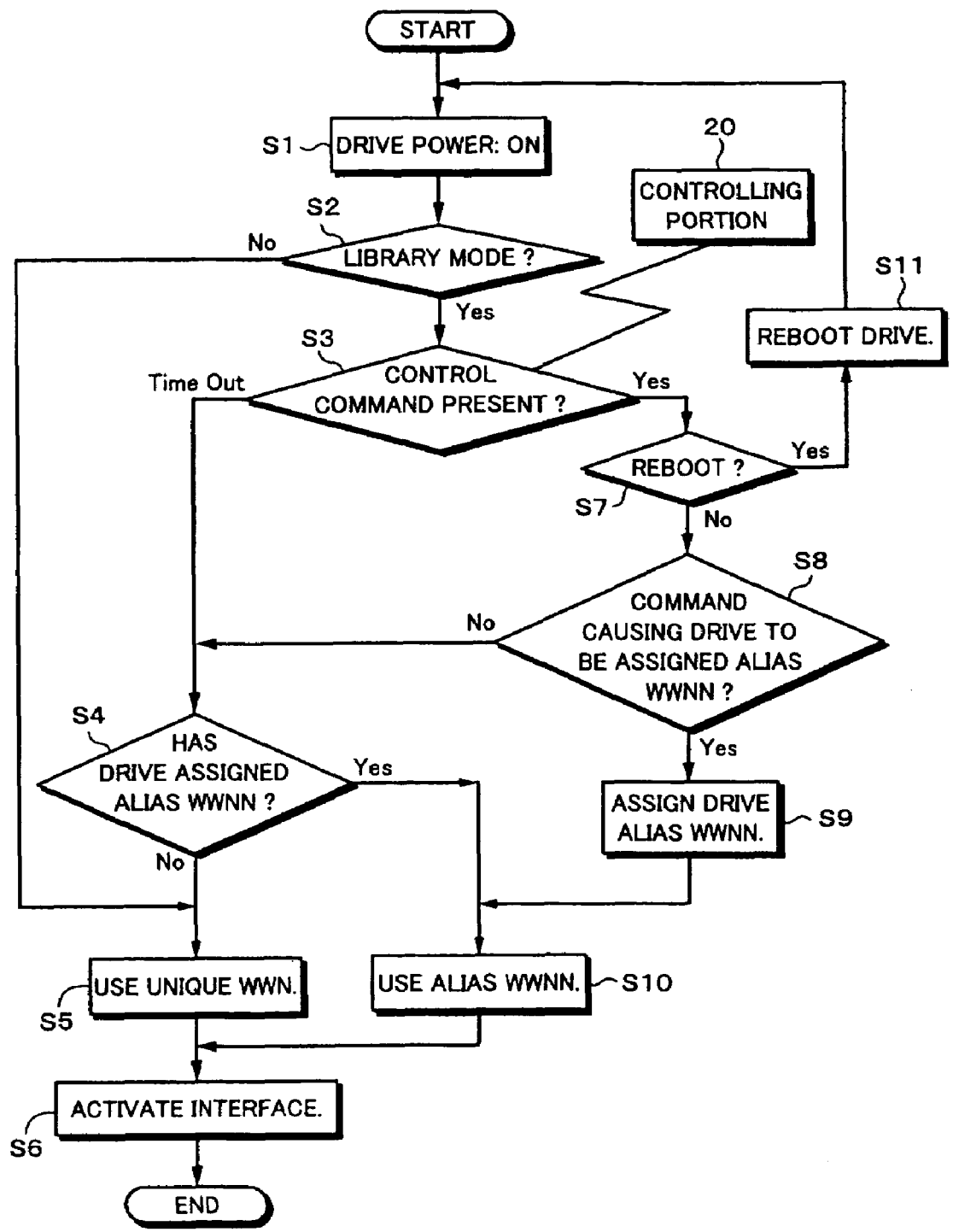
FIG. 4 is a flow chart describing control for FC drives according to the embodiment of the present invention.

Next, with reference to a flow chart shown in FIG. 4, an example of control for an FC drive will be described. Since the FC drives are controlled in the same manner, the control for each of the FC drive 32, the FC drive 33, and so forth is the same. Thus, for simplicity, control for only the FC drive 32 will be described in the following.

At step S1, the power of the library system 1 is turned on. As a result, the power is supplied to the FC drive 32.

At step S2, with a switch disposed for example on the front of the library system 1, it is determined whether or not the library system 1 has been set to a mode in which the library system 1 is used as a library (hereinafter this mode is referred to as library mode). When the determined result represents that the library system 1 has been set to the library mode, the flow advances to step S3. When the determined result represents that the library system 1 has not been set to the library mode, the flow advances to step S5.

At step S3, it is determined whether or not a control command has been sent from the controlling portion 20 to the FC drive 32 through the RS-232C cable in a predetermined time period. When the control command has been sent from the controlling portion 20 to the FC drive 32 in the predetermined time period, the flow advances to step S7. When the control command has not been sent from the controlling portion 20 to the FC drive 32 in the predetermined time period, the flow advances to step S4.

At step S4, it is determined whether or not the FC drive 32 has been assigned an alias WWNN. When the FC drive 32 has been assigned an alias WWNN, the flow advances to step S10. When the FC drive 32 has not been assigned an alias WWNN, the flow advances to step S5.

At step S5, the FC interface is set so that the WWN that has been uniquely assigned to the FC drive 32 is used as the address thereof in the library system 1. Thereafter, the flow advances to step S6.

At step S10, the FC interface is set so that the alias WWNN and the alias WWPN that have been assigned to the FC drive 32 are used as the address thereof in the library system 1. Thereafter, the flow advances to step S6.

At step S6, the FC interface of the FC drive 32 is activated so that the FC drive 32 can be used.

At step S7, it is determined whether or not the control command received form the controlling portion 20 contains a command that causes the FC drive 32 to be rebooted. When the determined result represents that the control command contains a command that causes the FC drive 32 to be rebooted, the flow advances to step S11. When the determined result represents that the control command does not contain a command that causes the FC drive 32 to be rebooted, the flow advances to step S8.

At step S11, the FC drive 32 is rebooted. Thereafter, the flow advances to step S1.

At step S8, it is determined whether or not the control command received from the controlling portion 20 contains a command that causes the FC drive 32 to assign an alias WWNN. When the determined result represents that the control command contains a command that causes the FC drive 32 to be assigned an alias WWNN, the flow advances to step S9. When the determined result represents a control command does not contain a command that causes the FC drive 32 to be assigned an alias WWNN, the flow advances to step S4.

At step S9, the FC drive 32 is assigned an alias WWNN and an alias WWPN. Thereafter, the flow advances to step S10.

Next, with reference to a flow chart shown in FIG. 5, an example of WWN assigning control performed by the controlling portion 20 will be described. At step S21, it is determined whether or not a communication between the controlling portion 20 and the FC drive 32 has been restored. When the determined result represents that the communication between the controlling portion 20 and the FC drive 32 has been restored, the flow advances to step S22. When the determined result represents that the communication has not been restored, the flow returns to step S21. At step S21, the same control is repeated. In other words, until the communication is restored, at step S21, the same control is repeated.

At step S22, it is determined whether or not the FC drive 32 has been assigned an alias WWNN and an alias WWPN. When the determined result represents that the FC drive 32 has been assigned an alias WWNN and an alias WWPN, the flow advances to step S23. When the determined result represents that the FC drive 32 has not been assigned an alias WWNN and an alias WWPN, the flow advances to step S25.

At step S23, it is determined whether or not the alias WWNN and the alias WWPN that have been assigned to the FC drive 32 represent a correct mounted position thereof. In other words, it is determined whether or not the alias WWNN represents a node ID of the library system. In addition, it is determined whether or not the alias WWPN represents a correct port ID of the FC drive 32 mounted on the library system. When the determined result represents that the alias WWNN and the alias WWPN represent the correct mounted position of the FC drive 32, the flow advances to step S24. When the determined result represents that the alias WWNN and the alias WWPN do not represent the correct mounted position of the FC drive 32, the flow advances to step S25.

At step S24, a command that causes the FC interface of the FC drive 32 to be activated is transmitted as a control command from the controlling portion 20 to the FC drive 32 so that the alias WWNN and the alias WWPN that have been assigned to the FC drive 32 are used as an address of the FC drive 32.

At step S25, the alias WWNN and the alias WWPN that represent the correct mounted position of the FC drive 32 are transmitted from the controlling portion 20 to the FC drive 32 through the RS-232C cable.

At step S26, a command that causes the FC drive 32 to be rebooted is transmitted as a control command from the controlling portion 20 to the FC drive 32. Thereafter, the flow advances to step S21. After the communication between the controlling portion 20 and the FC drive 32 is restored, the FC drive 32 is assigned the WWN that has been uniquely assigned thereto.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A tape library apparatus to which a node ID is assigned and that is connected to a host computer, comprising:
    a switch that switches the tape library apparatus between a library mode and one or more other operation modes;
    a plurality of drives that record and produce data to and from respective large capacity tape recording mediums, the drives having respective interfaces that transfer large capacity data to the host computer,
    wherein selected drives are assigned respective node IDs as first addresses and respective port IDs that represent mounted order numbers as second addresses and the interfaces are activated, the first address being used to determine whether a drive is new and the second address being used to determine whether a mounted drive is moved to a different port,
    wherein the first addresses and the second addresses are stored in a nonvolatile memory disposed in corresponding drives,
    wherein an address previously assigned to a particular drive upon production is used when (i) the particular drive is not assigned the first address and the second address and (ii) a command causing the particular drive to be assigned the first address and the second address is not received from the host computer, and
    wherein when each of the plurality of drives have been assigned the first address, the second address and the address assigned upon production, the first address and the second address are used as a communication address if the tape library apparatus is operated in the library mode and the address assigned upon production is used as the communication address if the tape library apparatus is operated in a mode other than the library mode.

2. The tape library apparatus as set forth in claim 1,
    wherein when a new drive is mounted on the tape drive apparatus, the newly mounted drive is assigned the first address and the second address in accordance with a command received from the host computer.

3. The tape library apparatus as set forth in claim 1, wherein when the mounted position of each of the selected drives is changed, the moved drive is assigned the first address and the second address in accordance with a command received from the host computer.

4. A method of controlling a tape library apparatus to which a node ID is assigned and that is connected to a host computer, comprising the steps of:

switching the tape library apparatus between a library mode and one or more other operation modes;

assigning respective node IDs as first addresses and respective port IDs that represent mounted order numbers as second addresses to a plurality of selected drives for recording and reproducing data to and from respective large capacity tape recording mediums, the selected drives having respective interfaces that transfer large capacity data to the host computer;

storing the first addresses and the second addresses in a nonvolatile memory disposed in corresponding drives;

determining whether a drive is new based on the first address;

determining whether a mounted drive is moved to a different port based on a second address;

activating the interfaces; and using an address previously assigned to a particular drive upon production when the particular drive is not assigned the first address and the second address and a command causing the particular drive to be assigned the first address and the second address is not received from the host computer, wherein when each of the plurality of drives have been assigned the first address, the second address and the address assigned upon production, the first address and the second address are used as a communication address if the tape library apparatus is operated in the library mode and the address assigned upon production is used as the communication address if the tape library apparatus is operated in a mode other than the library mode.

5. The method for controlling the tape library as set forth in claim 4, further comprising the step of:

when a new drive is mounted on the tape drive apparatus, assigning the newly mounted drive the first address and the second address in accordance with a command received from the host computer.

6. The method for controlling the tape library as set forth in claim 4, further comprising the step of:

when the mounted position of each of the selected drives is changed, assigning the moved drive the first address and the second address in accordance with a command received from the host computer.

* * * * *